(12) United States Patent
Gauthier et al.

(10) Patent No.: US 7,745,012 B2
(45) Date of Patent: *Jun. 29, 2010

(54) LEATHER DECORATIVE LAMINATE

(75) Inventors: Sylvie Gauthier, Shelton, CT (US); George Tsangarides, Meriden, CT (US)

(73) Assignee: Panolam Industries International, Inc., Shelton, CT (US)

( * ) Notice: Subject to any disclaimer, the term of this patent is extended or adjusted under 35 U.S.C. 154(b) by 43 days.

This patent is subject to a terminal disclaimer.

(21) Appl. No.: 10/762,103

(22) Filed: Jan. 20, 2004

(65) Prior Publication Data

US 2004/0151927 A1    Aug. 5, 2004

Related U.S. Application Data

(60) Provisional application No. 60/441,888, filed on Jan. 22, 2003.

(51) Int. Cl.
B32B 9/02 (2006.01)
B32B 9/04 (2006.01)

(52) U.S. Cl. ............ 428/473; 428/537.5; 428/542.2

(58) Field of Classification Search .......... 428/473, 428/524, 532, 537.5, 540, 542.2
See application file for complete search history.

(56) References Cited

U.S. PATENT DOCUMENTS

| | | | |
|---|---|---|---|
| 2,601,671 A | 6/1952 | Wilson et al. | |
| 2,622,991 A * | 12/1952 | Sturm | 427/256 |
| 2,721,817 A * | 10/1955 | Hastings, III et. al. | 428/51 |
| 2,732,325 A * | 1/1956 | Lindenfeiser et al. | 442/150 |
| 3,391,056 A | 7/1968 | Robinson, Jr. | 161/232 |
| 3,398,042 A | 8/1968 | Odenthal | 161/290 |
| 3,475,267 A | 10/1969 | Miles | 161/203 |
| 3,589,974 A * | 6/1971 | Albrinck et al. | 442/378 |
| 3,698,978 A * | 10/1972 | McQuade | 156/219 |
| 3,700,537 A * | 10/1972 | Scher | 428/138 |
| 4,132,821 A * | 1/1979 | Hiers et al. | 428/151 |
| 4,154,882 A | 5/1979 | Ungar et al. | 428/165 |
| 4,255,480 A * | 3/1981 | Scher et al. | 428/208 |
| 4,297,408 A | 10/1981 | Stead et al. | 428/240 |
| 4,311,748 A | 1/1982 | Casey et al. | 428/204 |
| 4,473,613 A | 9/1984 | Jaisle et al. | 428/220 |
| 4,864,790 A | 9/1989 | Liardet | 52/311 |
| 4,880,689 A | 11/1989 | Park et al. | 428/143 |
| 5,344,692 A | 9/1994 | Schmock | 428/161 |
| 6,099,938 A | 8/2000 | Stoyanovich | 428/151 |
| 6,395,408 B1 | 5/2002 | Nelson et al. | 428/690 |
| 6,423,167 B1 | 7/2002 | Palmer et al. | 156/209 |
| 6,632,507 B2 * | 10/2003 | Benton et al. | 428/141 |
| 7,179,538 B2 * | 2/2007 | Gauthier et al. | 428/473 |

FOREIGN PATENT DOCUMENTS

| | | |
|---|---|---|
| BE | 827997 | 8/1975 |
| DE | 44 47 171 A1 | 7/1996 |
| JP | 5237006 | 9/1993 |
| WO | WO 01/72512 | 10/2001 |

* cited by examiner

Primary Examiner—Thao T. Tran
(74) Attorney, Agent, or Firm—O'Shea Getz P.C.

(57) ABSTRACT

A heat and pressure consolidated laminate, and a method for manufacturing the same, is provided that includes in superimposed relationship a core layer containing a plurality of cellulosic sheets impregnated with a thermosetting resin, and a decorative layer consisting essentially of a leather material.

23 Claims, 1 Drawing Sheet

LEATHER DECORATIVE LAMINATE

This application claims the benefit of and priority from U.S. Provisional Patent Application Ser. No. 60/441,888, filed 22 Jan. 2003, which is hereby incorporated by reference in its entirety.

BACKGROUND OF THE INVENTION

1. Field of the Invention

The present invention relates to decorative laminates in general and, more particularly laminates having a leather or leather-like material as a decorative layer. In addition, the present invention relates to a method for manufacturing the same.

2. Background Information

Decorative laminates are often used in the construction of cabinetry, furniture, countertops, and other building products. There is considerable consumer demand for decorative laminates in a wide variety of colors, patterns, and textures. Natural leather is another popular material used in the construction of furniture and other applications. Leather is generally perceived as a quality material used in high-end applications. Unfortunately, leather can be difficult to work with because of size limitations, shrinkage, imperfections, etc. It would be useful, therefore, to provide a product that facilitates the incorporation of leather into applications including furniture, cabinetry, countertops, and the like.

DISCLOSURE OF THE INVENTION

According to the present invention, a heat and pressure consolidated laminate ("leather decorative laminate") is provided that comprises in superimposed relationship a core layer containing a plurality of cellulosic sheets impregnated with a thermosetting resin, and a decorative layer consisting essentially of a leather material.

In an embodiment of the present invention, the leather decorative laminate further includes a second decorative leather layer disposed on the side of the core layer opposite the first decorative layer. Depending on the application, the core layer can be increased in thickness to provide structural integrity.

Historically, leather clad panels used in furniture often required the furniture maker to stretch the leather skin to fit the panel. In some applications it was necessary to attach the edges of the skin to the panel's underside prior to attaching the panel to a substrate. In other instances, it was necessary to apply an adhesive to the leather and/or the substrate. Sufficient shrinkage in some instances would cause the skin to pull away from the underside of the panel, become detached from the substrate, or tear. An advantage of the present laminate is that it provides a leather-surfaced product that can be easily incorporated into furniture and cabinetry. Because the leather decorative layer is an integral part of the decorative laminate, there is no need to fit and/or adhere the skin to the panel or substrate. The present leather decorative laminate attaches to a substrate in the same manner high-pressure laminates are attached to a substrate. If necessary, the present leather decorative laminate can also be trimmed like high-pressure laminates. In short, the present leather decorative laminate provides a product that can reduce or eliminate many of the problems associated with using leather in cabinetry, furniture, and the like.

Another advantage of the present leather decorative laminate is that it is not dimensionally limited by the size of a natural leather skin. Some natural leathers are either limited by the size of the skin or require undesirable seams. The leather utilized in the present leather decorative laminate enables the present laminate to be manufactured in commercial size sheets without seams.

Another advantage of the present leather decorative laminate is that it can be made in a wide variety of colors and textures. As a result, it can be used in a variety of applications.

Another advantage of the present leather decorative laminate is that the present invention is a ready-to-use end product having a desirable leather surface.

Another advantage of the present leather decorative laminate is that it retains the smell of natural leather. Some leather or leather-like products used in furniture and cabinetry applications look like leather, but very few retain the desirable smell of leather. The fact that the present laminate retains the natural leather smells provides it with a definite commercial feature.

These and other objects, features, and advantages of the present invention will become apparent in light of the drawings and detailed description of the present invention provided below.

DETAILED DESCRIPTION OF THE INVENTION

Figure 1:
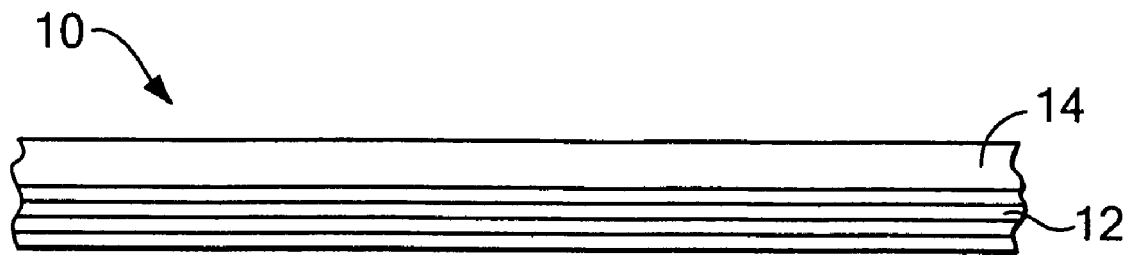
FIG. 1 is a diagram illustrating the superimposed constituent layers of the present leather decorative laminate.
Figure 2:
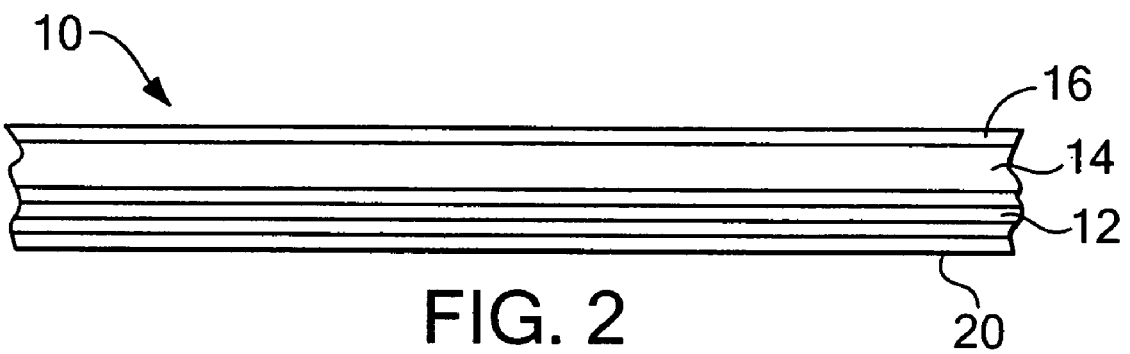
FIG. 2 is the present leather decorative laminate shown in FIG. 1, now including an overlay layer.
Figure 3:
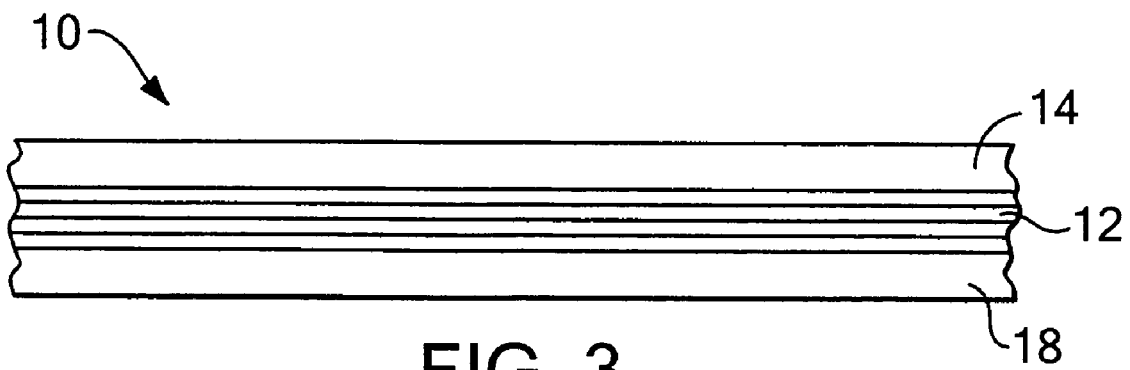
FIG. 3 is a diagram illustrating the superimposed constituent layers of the present leather decorative laminate, including a second decorative layer.

Now referring to FIGS. 1-3, the leather decorative laminate of the present invention is generally represented by reference numeral 10. The leather decorative laminate 10 includes a core layer 12 and a decorative layer 14.

The core layer 12 is of known construction, consisting of paper, woven fabrics, mats, felts, or the like. The core layer 12 preferably consists of one or more cellulosic sheets, preferably kraft paper, impregnated with a laminating resin. The basis weight of the cellulosic sheets can be varied to suit the application at hand. Any of the conventional laminating resins commonly used for the core layer, such as a phenolic, melamine, amino, epoxy, polyester, silicone, and diallyl phthalate resins, to name a few, may be used. The preferred laminating resin for the core layer sheets is a phenolic resin made from reaction of phenols with formaldehyde. The resin content of the impregnated sheets can be varied to suit the application at hand, but in most cases is between about 25% to about 35%. Resins of this type can be purchased commercially or prepared according to conventional procedures.

Alternatively, the core layer 12 may include a pigmented core paper such as that used in MelCor® brand laminates produced by the assignee of the present application. The MelCor® core paper provides the option of colored edges.

The decorative layer 14 includes a leather material. The "leather" referred to herein is an animal hide and is not limited to any particular type of animal. Preferably, the leather material of the present invention is a "bonded leather". The term "bonded leather" as used herein refers to a leather product that comprises leather shavings made from scrap and/or recycled leather. The shavings are processed into a sheet product using bonding agents. Bonded leather is commercially available and will not, therefore, be further described herein. A leather sheet thickness in the range of about 0.2 mm to about 4.0 mm is acceptable for most applications. A sheet thickness of about 0.2 mm to about 0.8 mm has particular utility. Although leather with an embossed finished surface can be used, it is preferable to use leather that initially has a smooth surface. Textures and other design features can be imparted to the laminate during the manufacturing process as will be explained in greater detail below.

Referring to FIG. 2, in some embodiments the present leather decorative laminate 10 further includes an overlay 16 disposed on the side of the leather decorative layer 14 opposite the core layer 12. The overlay 16 may, for example, consist of one or more sheets of high-quality alpha cellulose paper impregnated with a melamine formaldehyde resin. The alpha-cellulose paper acts as a translucent carrier for the resin, imparts strength to the resin, facilitates maintaining a uniform resin thickness, and provides additional abrasion resistance to the leather layer 14.

In some embodiments of the present invention, the leather decorative laminate 10 further includes a backer layer 20 disposed on the side of the core layer 12 opposite the first decorative layer 14. The backer layer 20 is of known construction, consisting of paper, woven fabrics, mats, felts, or the like. The backer layer 20 preferably consists of one or more cellulosic sheets impregnated with a laminating resin such as a melamine formaldehyde type resin. Backing sheets of this type can be purchased commercially or prepared according to conventional procedures.

Referring to FIG. 3, in some embodiments of the present invention the leather decorative laminate 10 further includes a second leather decorative layer 18 disposed on the side of the core layer 12 opposite the first decorative layer 14. Depending on the application, the core layer 12 can be increased in thickness to provide structural integrity.

A first process for manufacturing the present leather decorative laminate 10 involves stacking the core layer 12 sheets and the leather decorative layer 14 (and may include one or more of an overlay sheet 16, a backing sheet 20, and a second decorative layer 18) in a superimposed relationship (also referred to as a "build-up") between steel plates. A release sheet is placed between the press and the core layer 12, and between the decorative sheet 14,18 and the steel plate. The physical properties of each release sheet is chosen to ensure the release sheet does not bond with the decorative layer 14 or otherwise negatively affect the laminate materials. The release sheet contiguous with the leather decorative layer 14,18 is typically textured to impart an embossed texture or pattern to the laminate 10.

The build-up is then subjected to a predetermined pressure and temperature for a time sufficient to cure the laminating resins impregnating the respective layers. In production environment, a multiple opening press can be used to process multiple build-ups at the same time. In this process, a book of build-ups is created by stacking the respective layers of a first build-up in the aforementioned order (e.g., core layer sheets, decorative sheet). A release sheet is placed on top of the decorative sheet 14 (or overlay 16 if used), and a double-sided steel plate is placed on top of the release sheet. The next build-up is then stacked in opposite order on top of the double-sided steel plate (e.g., release paper, decorative sheet 14, core layer 12 sheets), and so on until the book is produced. Once the appropriate book size is created, the book is stored on the loading rack and the process is repeated until a plurality of books are stacked on the loading rack. The loading rack is then used to insert the books between the platens in the press. Pressure is applied to the press. After full pressure is reached, heat is applied until the predetermined temperature is reached. The press is held at the predetermined pressure and temperature for a period of time referred to as the "heating cycle", typically in the range of 2 to 20 minutes. The heat is subsequently removed, but the pressure maintained, for another predetermined period of time referred to as the "cooling cycle", typically in the range of 7 to 15 minutes. The pressure is then released and the build-ups, which are now leather decorative laminates 10, are removed. The heating cycle time range provided reflects the amount of time typically necessary for all of the laminates 10 in the press to reach and stay at the desired predetermined temperature. The actual temperature and pressure ranges may vary for different applications and process equipment. The cooling cycle is dictated by the amount of time necessary before the laminates 10 can be removed from the press and practically handled.

A second process for manufacturing the present leather decorative laminate 10 involves dispensing the core layer 12 sheets and the leather decorative layer 14 (and one or more of an overlay sheet 16, a backing sheet 20, and a second decorative layer 18, if used) in the aforesaid superimposed relationship upstream of a continuous press. The press is set up to create the temperature and pressure environment required to bond the layers into the finished laminate product. The line speed of the continuous press is chosen to create a dwell time within the press for the laminate 10 that is adequate to ensure sufficient bonding. A release sheet is disposed on each side of the build-up prior to entering the press. As stated above, the release sheet contiguous with the leather decorative layer 14 is typically textured to impart an embossed texture to the laminate. The release sheets are typically drawn off after the laminate exits the press, and rolled for further handling. The leather decorative laminate 10 continues onto downstream handling equipment; e.g., equipment that cuts the continuous laminate product into sheets, and handling equipment for the sheets. The continuous press is advantageous because it decreases the processing time of the laminate 10.

In both manufacturing processes, the elevated temperature and pressure environment causes the impregnated resins within the sheets to flow, which consolidates the constituents within each build-up into the integral leather decorative laminate 10. The present leather decorative laminate 10 is typically processed at a temperature in the range from about 120° C. to about 250° C., and at a pressure within the range of about 400 psi to about 1600 psi.

The following examples are illustrative of the present leather decorative laminate and do not constitute any limitation with regard to the subject matter of the invention:

Example I

A single leather decorative laminate 10 is manufactured using a non-continuous press. A build-up consisting of a release sheet, a plurality of core layer 12 sheets, a leather decorative layer 14, and a textured release sheet is made in a superimposed relationship and placed between steel plates. The build-up is then subjected to a pressure of about 1100 psi. Once the predetermined pressure is reached, the press is heated to a predetermined temperature of about 125° C. The press is held at the predetermined pressure and temperature for a heating cycle of about 14 minutes. After the heating cycle is completed, the heat is subsequently removed, but the pressure is maintained for a cooling cycle of about 11 minutes. The pressure is then released and the build-up, which is now a leather decorative laminate 10, is removed. The release sheets are removed and the leather decorative laminate 10 is complete.

Example II

A leather decorative laminate 10 can be manufactured in a continuous process using a GreCon® continuous high-pressure laminating press, which includes an inlet section, a heating section and a cooling section. The temperature of each section is controlled independently. The total amount of heat imparted to the layers of the build-up is controlled by the temperature of the different sections and the dwell time, which is dependent on the line speed. This continuous process requires that all of the various layers used to manufacture the laminate be fed into the press as continuous webs.

In the present example, the build-up consists of, from top to bottom, a textured release paper, a pre-dried leather decorative layer 14 and the core layer 12. All layers are fed in a continuous manner into the press at 5 feet/min. The temperature settings of the different press sections are as follows: the inlet section is set at 90° C., the heating section is 135° C., and the cooling section is 115° C. The pressure is set at approximately 400 psi.

It will be obvious to those skilled in the art that various changes may be made without departing from the scope of the present invention and that the invention is not to be considered limited to what is described and exemplified in the specification.

What is claimed is:

1. A heat and pressure consolidated laminate, comprising in superimposed relationship:
    a core layer containing at least one cellulosic sheet impregnated with a thermosetting resin;
    a first decorative layer consisting essentially of leather; and
    a bond formed from the thermosetting resin, which bond consolidates the layers together within the laminate.

2. The laminate of claim 1 wherein said thermosetting resin is a phenol-formaldehyde resin.

3. The laminate of claim 1, wherein said first decorative layer is bonded leather having a sheet thickness ranging from about 0.2 mm to about 4.0 mm.

4. The laminate of claim 1, further comprising an overlay layer disposed on a side of said decorative layer opposite said core layer.

5. The laminate of claim 1, further comprising a second decorative layer, disposed on the side of the core layer opposite the first decorative layer, said second decorative layer consisting essentially of leather.

6. The laminate of claim 1, further comprising a backer layer of at least one cellulosic sheet impregnated with a thermosetting resin, said backer layer being disposed on the side of the core layer opposite the decorative layer.

7. A heat and pressure consolidated laminate, comprising in superimposed relationship:
    a core layer containing at least one cellulosic sheet impregnated with a thermosetting phenol-formaldehyde resin, said cellulosic sheet having a resin content ranging from about 25 percent to about 35 percent;
    a first decorative layer consisting essentially of a bonded leather having a sheet thickness ranging from about 0.2 mm to about 4.0 mm; and
    an overlay layer disposed on a side of said first decorative layer opposite the core layer, said overlay layer being at least one sheet of alpha cellulose paper impregnated with a melamine formaldehyde resin.

8. The laminate of claim 7, further comprising a second decorative layer disposed on the side of the core layer opposite the first decorative layer.

9. The laminate of claim 8, where the second decorative layer consists essentially of a leather material.

10. The laminate of claim 7, further comprising a backer layer disposed on the side of the core layer opposite the first decorative layer.

11. The laminate of claim 10, where the backer layer comprises at least one cellulosic sheet impregnated with a thermosetting resin.

12. A heat and pressure consolidated laminate, comprising in superimposed relationship:
    a core layer containing at least one cellulosic sheet impregnated with a thermosetting phenol-formaldehyde resin, the cellulosic sheet having a resin content ranging from about 25 percent to about 35 percent;
    a first decorative layer consisting essentially of leather, the first decorative layer having a sheet thickness ranging from about 0.2 mm to about 4.0 mm; and
    a bond formed from the thermosetting resin, which bond consolidates the layers together within the laminate.

13. The laminate of claim 12, further comprising an overlay layer disposed on a side of the first decorative layer opposite the core layer.

14. The laminate of claim 13, where the overlay layer comprises at least one sheet of alpha cellulose paper impregnated with a melamine formaldehyde resin.

15. The laminate of claim 12, further comprising a second decorative layer disposed on the side of the core layer opposite the first decorative layer.

16. The laminate of claim 15, where the second decorative layer consists essentially of leather.

17. The laminate of claim 12, further comprising a backer layer disposed on the side of the core layer opposite the first decorative layer.

18. The laminate of claim 17, where the backer layer comprises at least one cellulosic sheet impregnated with a thermosetting resin.

19. A heat and pressure consolidated laminate, comprising in superimposed relationship:
    a core layer containing at least one cellulosic sheet impregnated with a thermosetting resin;
    a first decorative layer consisting essentially of a leather animal hide; and
    a bond formed from the thermosetting resin, which bond consolidates the layers together within the laminate.

20. The laminate of claim 19, further comprising a second decorative layer, disposed on the side of the core layer opposite the first decorative layer, said second decorative layer consisting essentially of a leather animal hide.

21. The laminate of claim 19, further comprising a backer layer of at least one cellulosic sheet impregnated with a thermosetting resin, said backer layer being disposed on the side of the core layer opposite the decorative layer.

22. A heat and pressure consolidated laminate, comprising in superimposed relationship:
    a core layer containing at least one cellulosic sheet impregnated with a thermosetting phenol-formaldehyde resin;
    a first decorative layer consisting essentially of a bonded leather animal hide;
    an overlay layer disposed on a side of said first decorative layer opposite the core layer; and
    a bond formed from the thermosetting resin, which bond consolidates the layers together within the laminate.

23. The laminate of claim 22, further comprising a second decorative layer disposed on the side of the core layer opposite the first decorative layer, and wherein the second decorative layer consists essentially of a leather animal hide.

* * * * *